(12) United States Patent
Uratani et al.

(10) Patent No.: US 9,501,876 B2
(45) Date of Patent: Nov. 22, 2016

(54) ON-ROAD RUNNING TEST APPARATUS

(71) Applicant: HORIBA, Ltd., Kyoto (JP)

(72) Inventors: Katsumi Uratani, Kyoto (JP); Shun Fukami, Kyoto (JP)

(73) Assignee: Horiba, Ltd., Kyoto (JP)

( * ) Notice: Subject to any disclaimer, the term of this patent is extended or adjusted under 35 U.S.C. 154(b) by 0 days.

(21) Appl. No.: 14/716,625

(22) Filed: May 19, 2015

(65) Prior Publication Data

US 2015/0332521 A1 Nov. 19, 2015

(30) Foreign Application Priority Data

May 19, 2014 (JP) .................................. 2014-103856

(51) Int. Cl.
*G07C 5/02* (2006.01)
*G07C 5/08* (2006.01)
*G01M 15/10* (2006.01)
*G01M 17/007* (2006.01)

(52) U.S. Cl.
CPC ................ *G07C 5/02* (2013.01); *G01M 15/10* (2013.01); *G01M 17/007* (2013.01); *G07C 5/08* (2013.01)

(58) Field of Classification Search
CPC .. G01M 15/10; G01M 17/00; G01M 17/007; G07C 5/02; G07C 5/08
USPC ........................................................ 701/29.1
See application file for complete search history.

(56) References Cited

U.S. PATENT DOCUMENTS

| 3,050,994 | A | * | 8/1962 | Heigl | G01M 17/007 73/118.01 |
| 4,382,388 | A | * | 5/1983 | Ono | G01M 15/044 73/116.05 |
| 5,986,545 | A | * | 11/1999 | Sanada | G01M 17/00 340/407.1 |
| 8,606,492 | B1 | * | 12/2013 | Botnen | G07C 5/008 701/123 |
| 9,208,626 | B2 | * | 12/2015 | Davidson | G06Q 10/08 |
| 2002/0134147 | A1 | * | 9/2002 | Janelle | G01L 3/108 73/114.04 |
| 2008/0269978 | A1 | * | 10/2008 | Shirole | G07C 5/008 701/29.5 |
| 2011/0087390 | A1 | * | 4/2011 | Pandit | B60K 1/00 701/22 |

FOREIGN PATENT DOCUMENTS

JP 06-323961 11/1994
WO 9935480 A1 7/1999

OTHER PUBLICATIONS

EESR dated Oct. 30, 2015 issued for European Patent Application No. 15 167 970.1, 8 pgs.
OBD II and Second Generation Scan Tools, NAPA Institute of Automotive Technology, Jan. 1, 1998, pp. 1-154.

* cited by examiner

*Primary Examiner* — Tyler J Lee
(74) *Attorney, Agent, or Firm* — Brooks Kushman P.C.

(57) ABSTRACT

In order to efficiently and reliably perform a valid field test, there are provided: a running data acquisition part for sequentially acquiring actual running data of a vehicle under execution of a running test on a road by a driver; and a tendency data output part for sequentially producing and outputting tendency data indicating a tendency as to whether or not the running test is valid, based on the actual running data during the running test.

6 Claims, 8 Drawing Sheets

ON-ROAD RUNNING TEST APPARATUS

CROSS-REFERENCE TO RELATED APPLICATION

This application claims priority to JP Application No. 2014-103856, filed May 19, 2014, the disclosure of which is incorporated in its entirety by reference herein.

TECHNICAL FIELD

The present invention relates to an on-road running test apparatus for a vehicle to be used when a running test of the vehicle is performed on a road such as a public road.

BACKGROUND ART

Conventionally, there is known a test (also referred to as "field test" hereinafter) for measuring such as exhaust gas components and fuel consumption while a driver is running a vehicle, for example, on a public road. This field test allows to obtain data closer to areal usage, as compared to an indoor test using such as a chassis dynamometer. Therefore, in recent years, there has been started consideration of enactment of laws such as defining regulations by measurement values of such as exhaust gas amounts obtained by this field test.

In this case, for a comparative evaluation, it is necessary to match running modes of vehicles (also referred to as "running mode" hereinafter) to be a constant standard.

For example, in the test using a chassis dynamometer mentioned above, as disclosed in JP Hei 06-323961A, a predetermined running speed pattern is defined as a running mode and it is intended to be able to comparatively evaluate such as an exhaust gas amount and fuel consumption obtained as a result of driving by a driver or an automatic drive robot in accordance with the running speed pattern every vehicle.

In contrast, in the field test, the running speed pattern cannot be maintained due to an occurrence of an unexpected situation such as waiting for a traffic light and traffic congestions. Therefore, it is considered to standardize, as a running mode, for example, a vehicle speed distribution (for example, a running time ratio in a low speed region, middle speed region and high speed region) in, for example, a running distance, running time and running test.

SUMMARY OF INVENTION

Technical Problem

However, it is impossible for a driver to know, for example, whether or not the speed distribution is present within a predetermined standard range, during a test driving, and therefore it should be determined based on the resultant data after the field test is completed. Then, in the case where the speed distribution is not present within the predetermined range, that is, in the case of turning out to be unsatisfying the predetermined running mode, there may occur a disadvantage such that the field test has to be redone from the beginning or an additional field test has to be done. Further, for fear of this, there may be a case where the field test is performed unnecessarily for a long time.

The present invention has been made in order to solve the above problems and it is intended to be able to efficiently and reliably perform a valid field test.

Solution to Problem

That is, an on-road running test apparatus for a vehicle according to the present invention includes:

a running data acquisition part for sequentially acquiring actual running data of the vehicle under execution of a running test on a road by a driver; and a tendency data output part for sequentially producing and outputting tendency data indicating a tendency as to whether or not the running test is valid, based on the actual running data during the running test.

With this configuration, since the tendency data output part sequentially produces and outputs the tendency data indicating a tendency as to whether or not the running test is valid, based on the actual running data during the running test, a driver performing a field test can know a tendency as to whether or not the field test is valid, during the running test. Thus, it becomes possible to control a drive in accordance with the tendency and a valid field test can be performed in just proportion without starting over the field test again or performing the field test wastefully for a long time as in the prior art.

In the case where a running mode of the running test is defined by one or more predetermined running mode definition parameters and the running mode satisfies a predetermined condition, the running test is determined to be valid. In this configuration, in the case where the tendency data output part sequentially obtains values of the one or more running mode definition parameters based on the actual running data and sequentially outputs the values of the parameters as the tendency data, a driver can know the tendency of the currently running mode more reliably.

As a specific running mode definition parameter, there can be exemplified, for example, a speed distribution in a test travel, a two-dimensional amount of a rotational speed of an engine and an engine torque, a running distance, a two-dimensional amount of an amount of $CO_2$ emission and a vehicle speed, and the like.

Advantageous Effects of Invention

According to the present invention configured as described above, a valid field test can be efficiently and reliably performed.

BRIEF DESCRIPTION OF EMBODIMENTS

The following describes one embodiment of the present invention with reference to the accompanying drawings.

Figure 1:
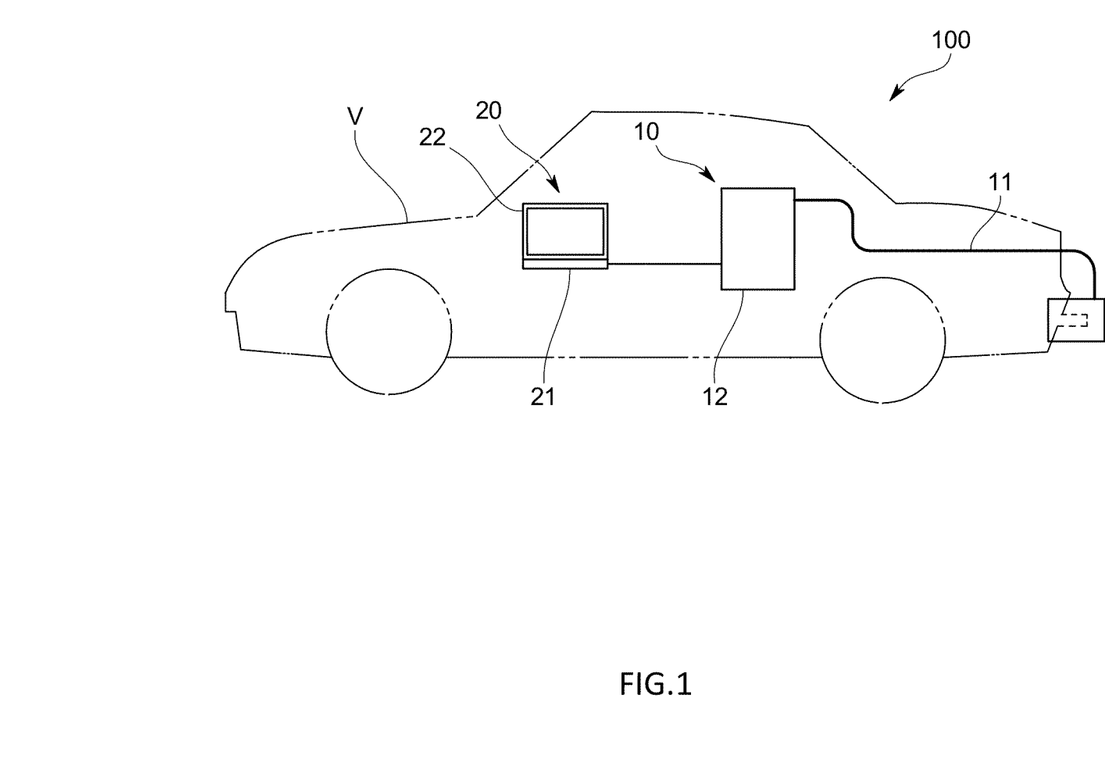
FIG. 1 is a schematic diagram showing a whole configuration of an on-road running test apparatus in the present embodiment.

As shown in FIG. 1, an on-road running test apparatus 100 according to the present embodiment is used in a field test for measuring such as exhaust gas components and fuel consumption while a driver is running a vehicle V on a public road, and this on-road running test apparatus 100 is provided with a vehicle-mounted exhaust gas analyzing device 10 and an information processing unit 20 that is communicatively connected to the exhaust gas analyzing device 10.

Each of the devices is explained.

As shown in FIG. 1, the vehicle-mounted exhaust gas analyzing device 10 is provided with a hose 11 for capturing a part of exhaust gas from a tail pipe of the vehicle V and an analyzing device main body 12 for analyzing the exhaust gas captured through the hose 11. This analyzing device main body 12 measures an exhaust gas flow rate and quantities (or concentrations) and the like of $CO$, $CO_2$, $H_2O$, $NO_x$, THC, PM, etc. contained in the exhaust gas, and further calculates such as fuel consumptions therefrom.

The information processing unit 20 is a general-purpose computer device equipped with a device main body 21 including such as a CPU, a memory and a communication port, input means (not shown) such as a keyboard and a display 22, and this information processing unit 20 is mounted in the vehicle compartment, similarly to the exhaust gas analyzing device 10.

Figure 2:
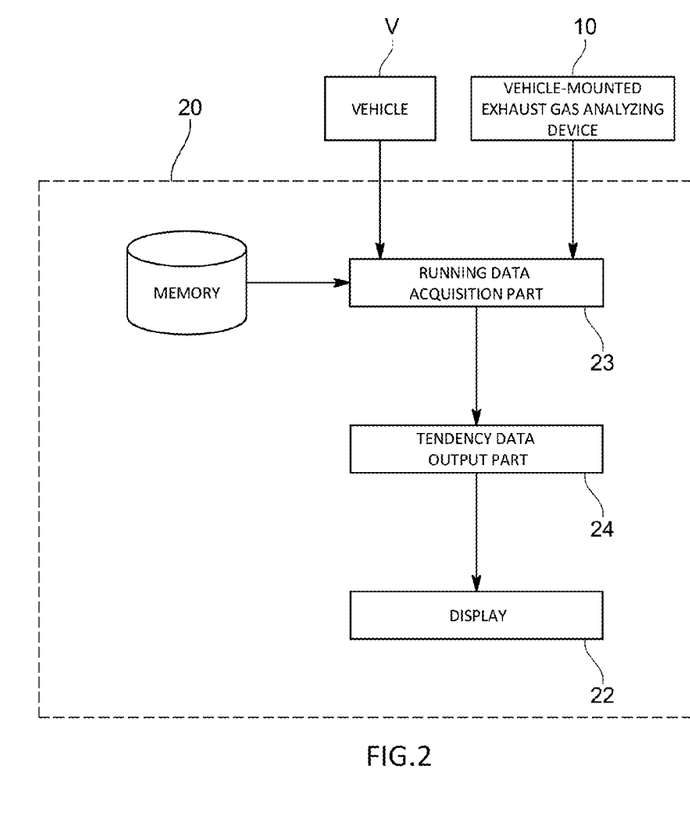
FIG. 2 is a functional block diagram showing a function of an information processing unit in the same embodiment.

Then, the information processing unit 20 is operated in accordance with a predetermined program stored in the memory. Thus, as shown in FIG. 2, the information processing unit 20 is configured so exhibit functions as: a running data acquisition part 23 for sequentially acquiring actual running data of the vehicle V under execution of a field test; and a tendency data output part 24 for sequentially producing and outputting tendency data indicating a tendency as to whether or not the field test is valid, based on the actual running data during the field test.

First, the actual running data is explained. The actual running data referred here is data indicating such as a throttle opening degree, brake ON/OFF, engine rotational speed, vehicle speed, shift lever, gear ratio, vehicle acceleration, engine torque, cooling water temperature, intake pressure, intake and exhaust temperatures, exhaust gas flow rate, exhaust gas components, catalyst temperature and fuel consumption.

The running data acquisition part 23 acquires such as an exhaust gas flow rate, exhaust gas components and fuel consumption among the actual running data via a communication port connected to the exhaust gas analyzing device 10 and acquires such as an engine rotational speed, vehicle speed, throttle opening degree, brake ON/OFF, intake and exhaust temperatures, cooling water temperature and engine torque which are obtained from such as a sensor provided in each part of the vehicle V via a communication port connected to a communication line such as an ECU (Electronic Control Unit) or a TCU (Telecommunication Control Unit) of the vehicle V. Note that there is a case where this running data acquisition part 23 may calculate actual running data, which cannot be directly obtained, from values of the other actual running data. For example, in the case where an engine torque cannot be obtained, there may be a case where an engine torque is calculated from an engine rotational speed and a throttle opening degree with reference to a torque/rotational speed map stored in the memory. Also, the other various kinds of actual running data may be acquired by providing a separate sensor.

The tendency data output part 24 is intended to sequentially produce and output tendency data indicating a tendency as to whether or not a field test is valid with respect to criteria such as, laws and measurement rules, based on the actual running data during the field test.

Note that, this tendency data is affected by a controlled state (condition) of a vehicle used in a field test and a running state of a vehicle in the field test due to such as a congested degree of a road.

Before this tendency data output part 24 is described, the criteria of validity of the field test is first described.

A running mode in a field test is defined by a plurality of running mode definition parameters. The running mode definition parameters here mainly include a running distance in the field test, a speed distribution in the field test, and a two-dimensional amount comprised of an engine rotational speed and an engine torque.

And in the case where each of the running mode definition parameters are within a predetermined range, the field test is determined to be valid, and various measurement results in the field test at that time are subjected to evaluation.

In this embodiment, in the case where the two-dimensional amount including an engine rotational speed and an engine torque is, for example, within a predetermined valid range and this valid state is maintained for a predetermined time (for example, 30 seconds) or more (i.e., upon satisfaction of a first condition for determining a partial validity of the field test) and a total running distance is equal to a predetermined value or more and a speed distribution throughout the running, for example, here running time ratios in a low speed area, middle speed area and high speed area are within a predetermined range (i.e., upon satisfaction of a second condition for determining a validity of the entire test running), the measurement results (such as a fuel consumption and exhaust gas component quantity) in the field test are determined to be valid and subjected to evaluation.

Not that, regarding the first condition, in the case where the two-dimensional amount is maintained for a predetermined upper limit time (for example, 120 seconds) or more even though the two-dimensional amount is maintained within the valid range for a predetermined time or more, it may be determined that a part of the field test beyond the upper limit time does not satisfy the first condition, that is, determined to be invalid, so long as the two-dimensional amount is never out of the valid range.

Thus, the tendency data output part 24 uses these running mode definition parameters as the tendency data, and every time actual running data is obtained, the tendency data output part 24 sequentially produces and updates the running mode definition parameters by performing such as extraction and conversion of the actual running data. Then the values of the running mode definition parameters are outputted to be displayed as numerical or graphical expression on a screen of the display 22.

Here, a specific display aspect is described with reference to FIGS. 3 to 5.

Figure 3:
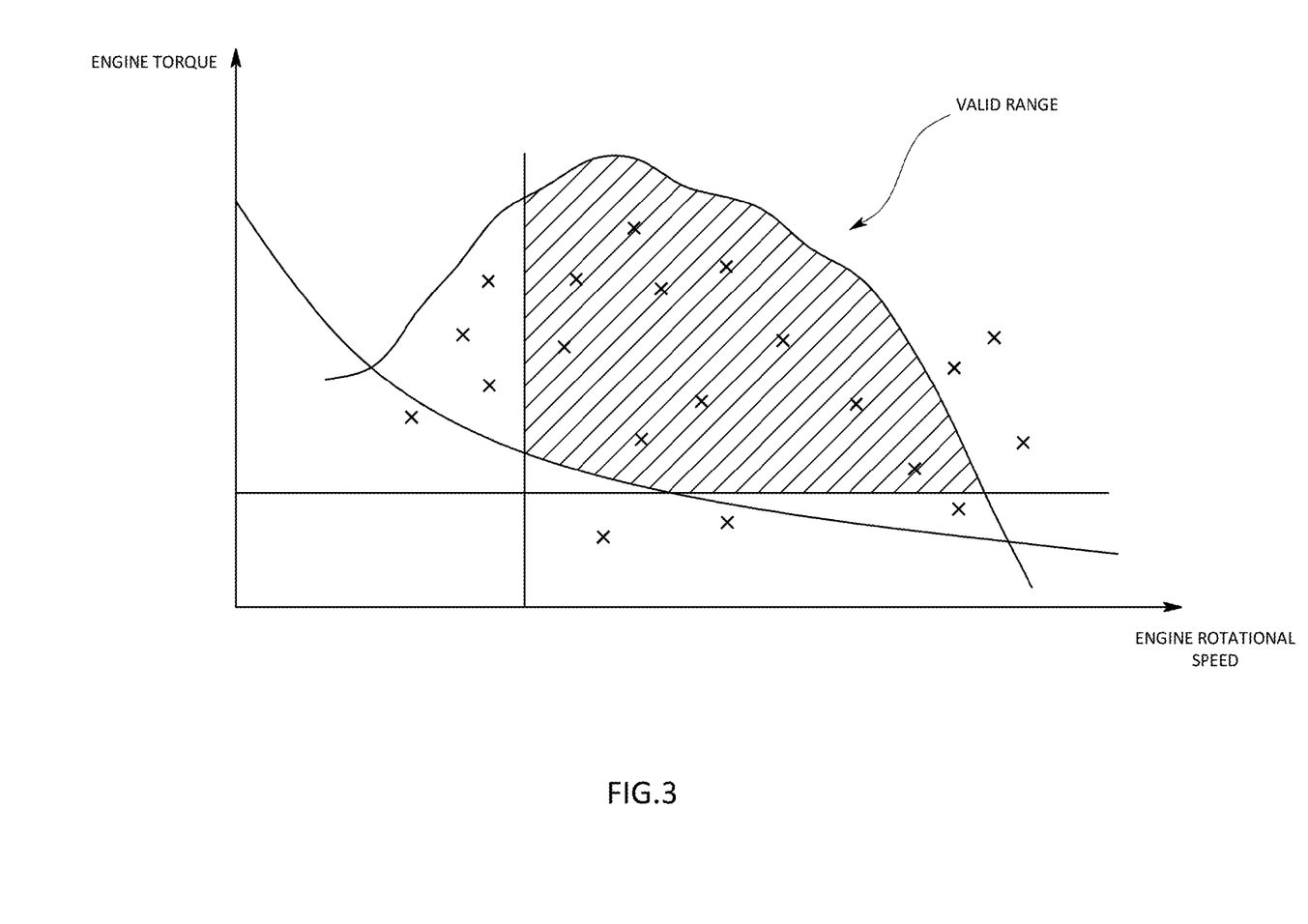
FIG. 3 is a diagram for explaining a validity of a field test in the same embodiment.
Figure 4:
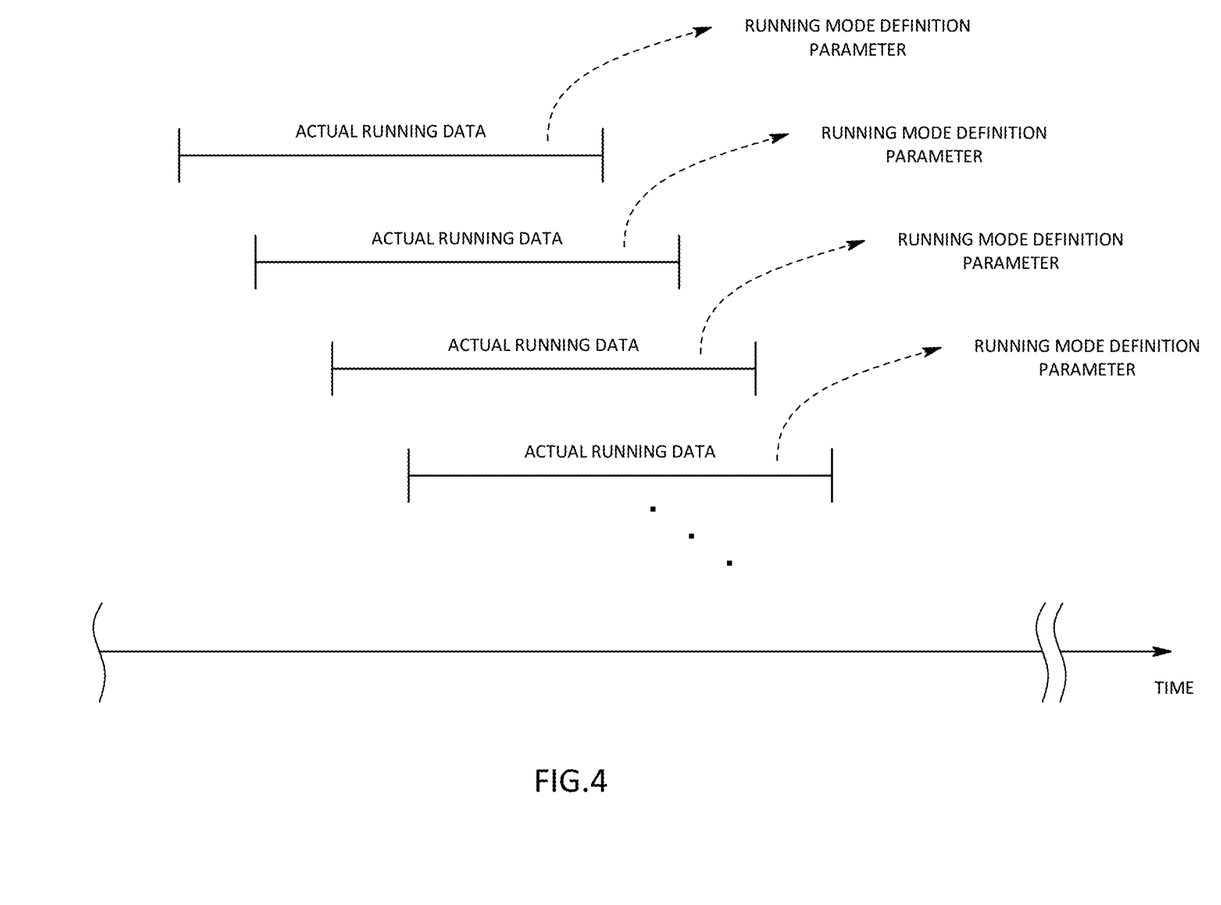
FIG. 4 is a diagram for explaining actual running data and a running mode definition parameter in the same embodiment.

Regarding the two-dimensional amount of the engine rotational speed and the engine torque, as shown in FIG. 3, the two-dimensional amount of the engine rotational speed and the engine torque obtained based on the actual running data is sequentially plotted with time lapse together with a predetermined valid range to be displayed on a graph taking an engine torque on its vertical axis and an engine rotational speed on its horizontal axis. However, when the two-dimensional amount is plotted too long time, the graph is congested to be filled with the plots and it becomes hard to understand the graph. Therefore, the plots after a predetermined time elapses are deleted here and the changes of the engine rotational speed and the engine torque in a predetermined past time period going back from the present time are to be displayed. In this embodiment, it is configured that the tendency data output part 24 counts the plots within the valid range, and then the counted number and a ratio of the plots existing within the valid range are outputted to be displayed, for example, on the screen of the display 22. Also, the tendency data output part 24 may be configured so as to output to display an integration value of the time in which the field test is being performed within the valid range, on the screen.

In this case, it is preferable that the valid range is clearly designated by coloring and the like.

By displaying in this way, the engine rotational speed and the engine torque are displayed in real time, and thus a driver is allowed to recognize whether or not the current operation is suitable for the field test.

Further, since the counted number of the plots within the valid range is displayed on the screen of the display 22, the driver can easily determine the validity of the field test by comparing the counted number with a predetermined value.

Note that the values of the running mode definition parameters may be calculated every time the actual running data is sampled and transmitted. However, in the present embodiment, as shown by a concept in FIG. 4, the actual running data obtained by sampling multiple times every unit interval of a certain constant time period or a certain constant running distance is stored in the memory and the values of the running mode definition parameters may be obtained based on such as averaging the multiple-sampled actual running data, every unit interval. The actual running data obtained by the samplings of multiple times may be partially overlapped as shown in FIG. 4.

Figure 5:
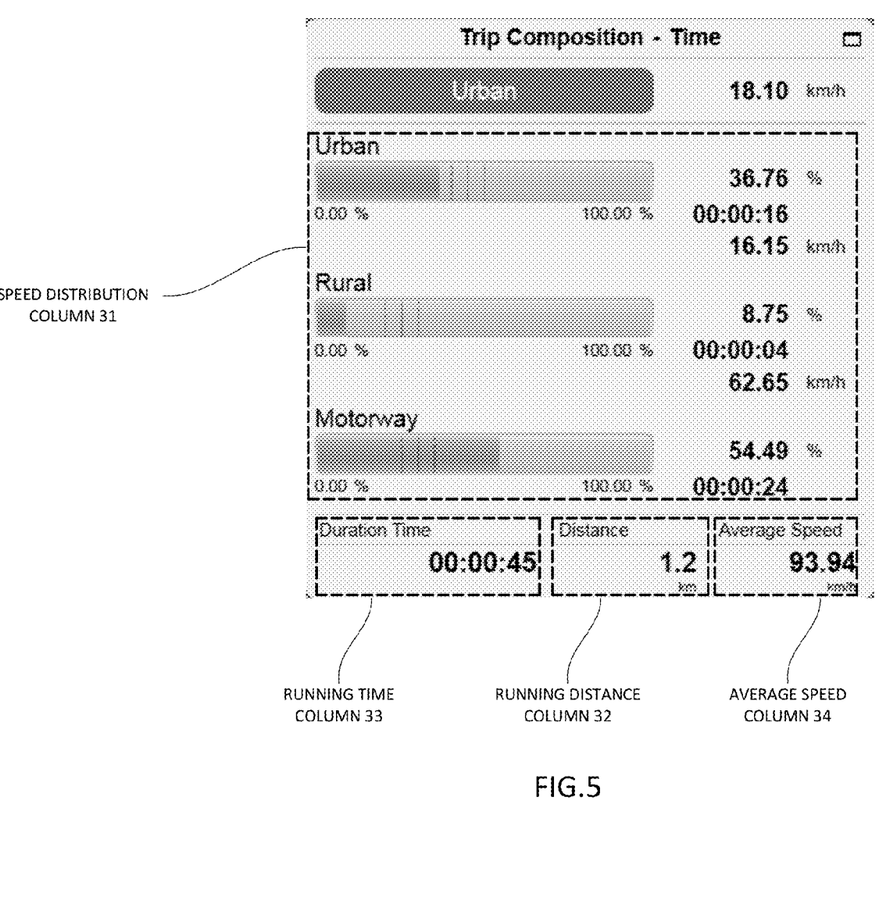
FIG. 5 is an image which a tendency data output part displays on a display in the same embodiment.

In the speed distribution, as shown in FIG. 5, the integration time of running in each of the plurality of speed regions (each of the three speed regions in this embodiment) from the start of the test running to the present is displayed in a speed distribution column 31 in a state of a bar graph in each of the speed regions. In each of the graphs, it is preferable that a region in which a field test is valid is clearly designated by coloring and the like. Further, in the present embodiment, the integration time and a ratio of the integration time to a total running time from the start of the test running to the present are displayed in a position corresponding to each of the bar graphs.

Thus, the driver is allowed to recognize whether or not the running speed ratio in the field test up to the present is appropriate.

Regarding the running distance, as shown in FIG. 5, the total running distance from the start of the test running to the present is intended to be displayed as numerical expression in a running distance column 32.

Here, at the same time of displaying the total running distance, the running time and average speed are intended to be displayed as numerical expression in a running time column 33 and an average speed column 34, respectively, on the same screen as that of the total running distance.

In this embodiment, the tendency data output part 24 is configured so as to simultaneously output to display all or optionally two of the two-dimensional amount of the engine rotational speed and engine torque, the speed distribution and the running distance, on the same screen.

Thus, with this configuration, since the tendency data output part 24 displays the values of the tendency data on the screen for a driver driving the vehicle V, the driver only need, for example, look at the running distance column 32 and drive the vehicle so that the running distance becomes equal to or larger than the specified value. Also, regarding the speed distribution, in the case where, for example, a running ratio in a high speed region is not enough, the driver only need enter a motorway and increase a running ratio thereof and drive the vehicle so that the running ratio becomes within a predetermined range. Further, at the time of this driving, in the case where the driver keeps in mind an accelerator work and shift change so that the engine rotational speed and the engine torque are in the predetermined ranges while confirming the graph displayed on the screen of the display 22, unnecessary running can be prevented.

Figure 6:
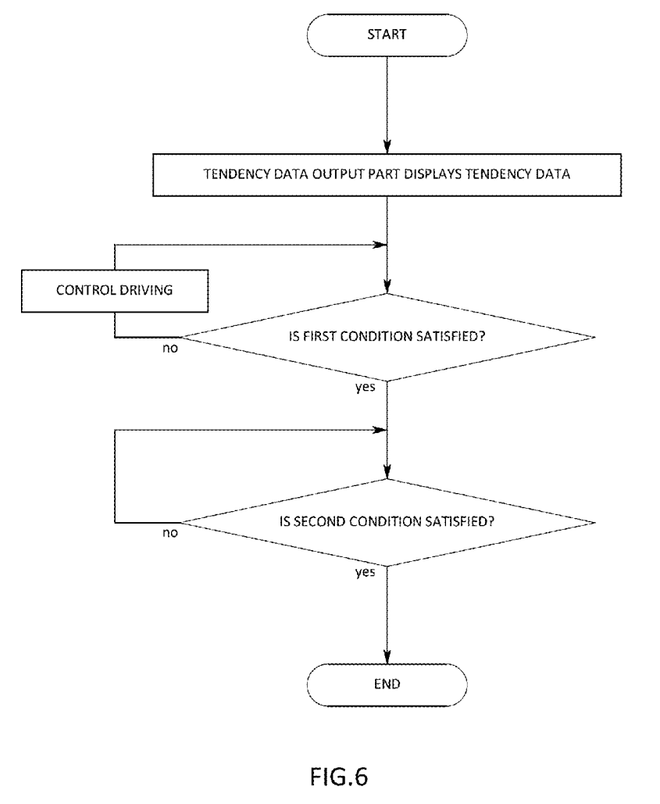
FIG. 6 is a flow chart for explaining a judgment of the validity of the field test in the same embodiment.

Here, the following describes the determination of validity of the field test in the present embodiment with reference to the flowchart shown in FIG. 6.

Upon start of the field test, the tendency data output part 24 displays the various running mode definition parameters used as the tendency data, i.e., in the present embodiment, the two-dimensional amount of the engine rotational speed and engine torque, speed distribution and running distance, on the screen.

Then, the driver first confirms the two-dimensional amount of the engine rotational speed and engine torque displayed on the screen to thereby confirm the tendency as to whether or not the first condition for determining the partial validity of the field test.

In the case of recognizing that the driving at this time does not satisfy the first condition, the plots and the valid range displayed on the screen are compared and the driving is controlled by changing the engine rotational speed and the like so as to be plotted within the valid range.

Subsequently, the driver confirms the speed distribution and running distance displayed on the screen to thereby confirm whether or not the second condition for determining the validity throughout the field test is satisfied.

Thus, in the case where the second condition is not yet satisfied, the field test is continued until the second condition is satisfied.

Further, in the case where it is confirmed that the second condition is satisfied, the field test can be finished.

Thus, since the driver performing a field test can know a tendency as to whether or not the field test is valid during the running, a valid field test can be performed appropriately by controlling the driving in accordance with the tendency, without repeating the field test or performing the field test wastefully for a long time as in the conventional way.

Further, the driver can properly determine in an unexpected situation such as waiting for a traffic light or traffic congestion whether a current field test under execution should be continued or cancelled.

Furthermore, a test course to be created for reproducing various running patterns can be made useful based on the tendency data indicating the tendency as to whether or not the field test is valid.

Noted that the present invention should not be limited to the present embodiment.

Figure 7:
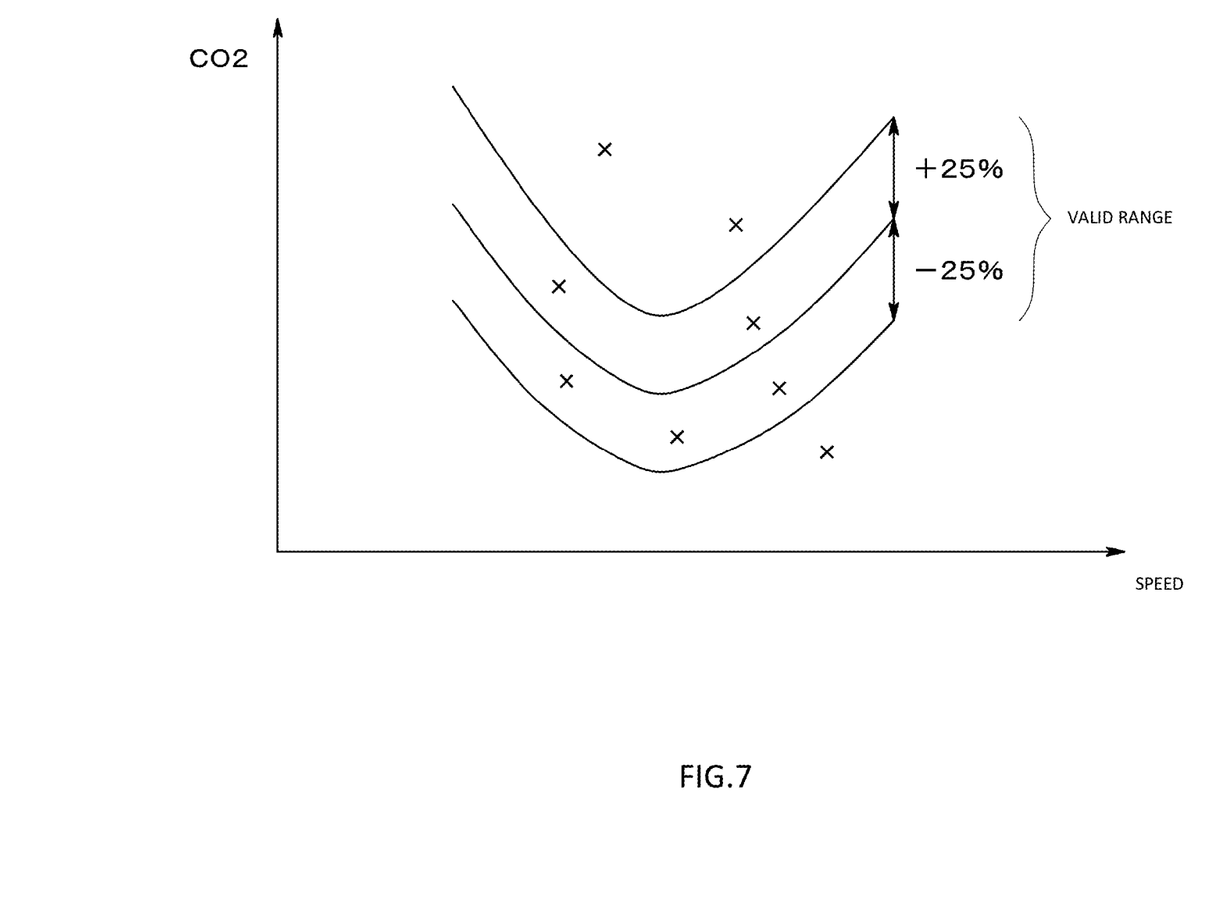
FIG. 7 is a diagram for explaining the validity of the field test in the other embodiment of the present invention.

For example, in the present embodiment, although the running mode definition parameters directly used for determining whether or not a field test is valid are used as the tendency data, other parameters indirectly suggesting a running mode can be used. For example, as shown in FIG. 7, a two-dimensional amount of a $CO_2$ emission amount and an average vehicle speed may be displayed as the tendency data by, e.g., sequentially plotting a $CO_2$ emission amount per a unit distance and, e.g., an average vehicle speed in a unit distance thereof on a graph respectively taking on a vertical axis and a horizontal axis thereof. In this case, it is more preferable to, e.g., color an appropriate region on the graph. In addition, the information processing unit 20 may be configured so that the counted number of the plots within the appropriate region mentioned above is outputted to be displayed on the screen of the display and this counted number is compared with a predetermined value. Thus, the validity of the field test can be determined.

Note that instantaneously varying parameters such as power or an exhaust flow rate may be taken on the horizontal axis instead of the average vehicle speed.

Also, in addition to the embodiment described above, the information processing unit may be configured so as to sequentially plot a $CO_2$ emission amount per a unit time divided by a running distance per a unit time and, e.g., an average vehicle speed in the unit time on a graph respectively taking on a vertical axis and a horizontal axis thereof.

Further, the information processing unit may be configured so as to sequentially plot a value obtained by dividing the integration amount by a running distance at a time of a $CO_2$ emission amount reaching a predetermined integration amount and, e.g., an average vehicle speed in the running distance on a graph respectively taking on a vertical axis and a horizontal axis thereof.

In addition, it may be configured so as to sequentially plot a $CO_2$ emission amount per a unit workload and an average vehicle speed in a running distance corresponding to the unit workload on a graph respectively taking on a vertical axis and a horizontal axis thereof.

Note that, instead of a $CO_2$ emission amount, an emission amount (exhaust gas data) of components contained in exhaust gas such as CO, $H_2O$, $NO_X$, THC and PM may be used.

In the case where the running mode definition parameters are defined by other parameters than those of the present embodiment, it is preferable to display the other parameters.

Figure 8:
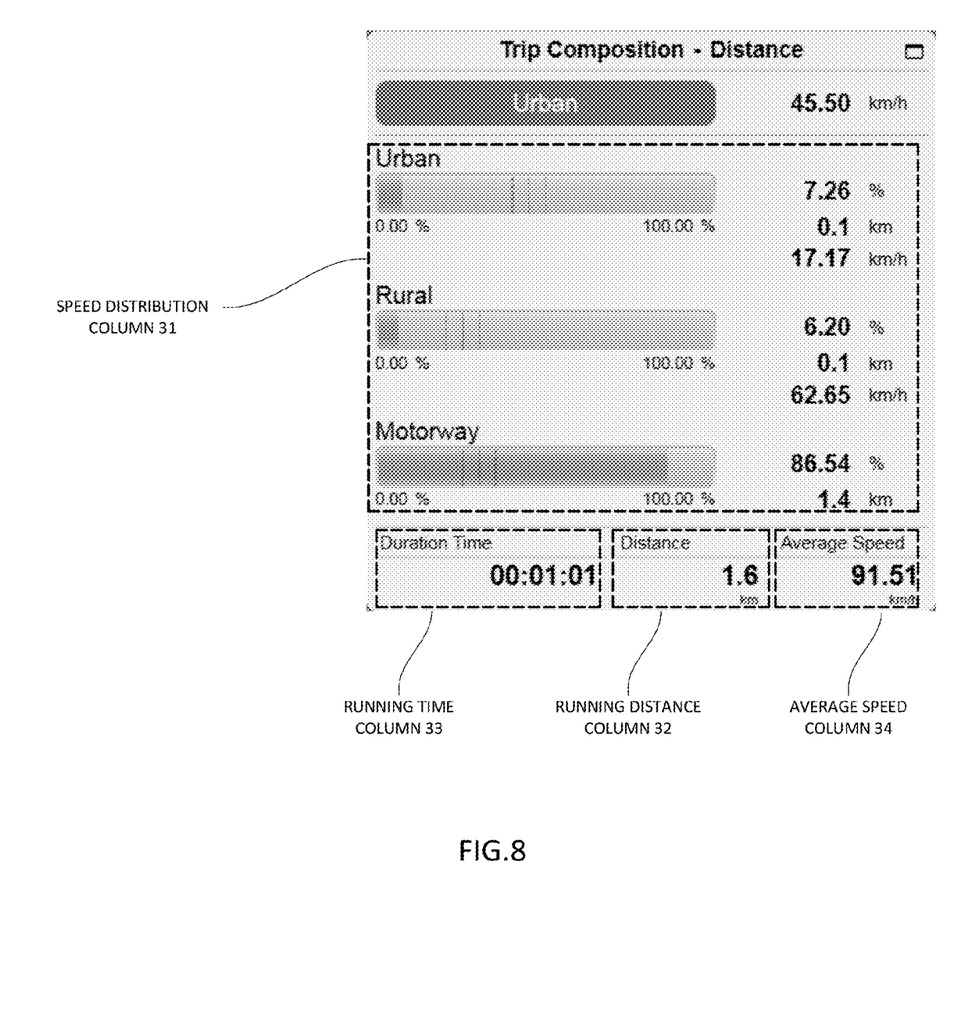
FIG. 8 is an image which the tendency data output part displays on a display in the other embodiment of the present invention.

For example, regarding the speed distribution of the present embodiment, although the integration times of the respective running in each of the speed regions are displayed in the speed distribution column 31, instead of the integration times, for example, as shown in FIG. 8, integration distances of the respective running in each of the speed regions may be displayed in the speed distribution column 31.

In this case, it is preferable that the tendency data output part displays the integration distance so that a display mode of the speed distribution may be switchable to any of the integration time or integration distance.

It is also possible to impart an arithmetic function of the exhaust analyzing device to the information processing unit and to impart an arithmetic/display function of the information processing unit. In short, the functions exhibited by a computer may be imparted to any physical device.

It is also possible to place the display of the information processing unit in a control room in addition to a vehicle and transmit data by radio, and thus the running mode can be monitored by both of a driver and an operator in a control room. The display may be placed only in the control room and an operation command may be transmitted, for example, from an operator to a driver.

The tendency data output part may not only output tendency data to the display but also output, for example, by voice. In this way, the driver can always see the outside of a vehicle and drive the vehicle more safely.

It is needless to say that various modifications of the present invention can be made in a range without departing from the spirit thereof.

REFERENCE SIGNS LIST

100 . . . On-road running test apparatus
V . . . Vehicle
10 . . . Vehicle-mounted exhaust gas analyzing device
20 . . . Information processing unit
21 . . . Apparatus main body
22 . . . Display
23 . . . Running data acquisition part
24 . . . Tendency data output part
31 . . . Speed distribution column
32 . . . Running distance column
33 . . . Running time column

What is claimed is:

1. An on-road running exhaust gas test apparatus for a vehicle comprising:
   a processor connected to a display and configured to
      sequentially acquire actual running data of the vehicle, via sensors, under execution of a running exhaust gas test on a road by a driver,
      sequentially produce tendency data indicating a tendency as to whether or not the running exhaust gas test is valid, based on the actual running data during the running exhaust gas test,
      comparably output the tendency data and a predetermined condition for validating the running exhaust gas test on the display, and
      sequentially update contents of the display during the running exhaust gas test to indicate state of progress towards meeting requirements for the running exhaust gas test to be valid.

2. The on-road running exhaust gas test apparatus according to claim 1, wherein in the case where a running mode of the running exhaust gas test is defined by one or more predetermined running mode definition parameters and the running mode satisfies the predetermined condition, the running exhaust gas test is determined to be valid, and wherein the processor is further configured to sequentially obtain values of the one or more running mode definition parameters based on the actual running data and to sequentially output the values of the parameters as the tendency data.

3. The on-road running exhaust gas test apparatus according to claim 2, wherein a speed distribution in a test travel is used as the running mode definition parameters.

4. The on-road running exhaust gas test apparatus according to claim 2, wherein a two-dimensional amount of a rotational speed of an engine and an engine torque is used as the running mode definition parameters.

5. The on-road running exhaust gas test apparatus according to claim 2, wherein a two-dimensional amount of an amount of CO2 emission and a vehicle speed is used as the running mode definition parameters.

6. A recording medium mounted on an on-road running exhaust gas test apparatus for a vehicle, having a program recorded therein for allowing a processor of the on-road running exhaust gas test apparatus to exhibit functions of:
   a running data acquisition part for sequentially acquiring actual running data of the vehicle, via sensors, under execution of a running exhaust gas test on a road by a driver; and
   a tendency data output part for sequentially producing tendency data indicating a tendency as to whether or not the running exhaust gas test is valid, based on the actual running data during the running exhaust gas test, comparably outputting the tendency data and a predetermined condition for validating the running exhaust gas test on a display, and sequentially updating contents of the display during the running exhaust gas test to indicate state of progress towards meeting requirements for the running exhaust gas test to be valid.

\* \* \* \* \*